Patented July 19, 1949

2,476,914

UNITED STATES PATENT OFFICE 2,476,914

1-ALKYL-4-(N-BENZYL-N-BETA-PYRROLI-DINOETHYLAMINO)-PIPERIDINES AND THEIR PRODUCTION

Robert H. Reitsema, Kalamazoo, Mich., assignor to The Upjohn Company, Kalamazoo, Mich., a corporation of Michigan No Drawing. Application April 30, 1948,
Serial No. 24,425

4 Claims. (Cl. 260—293)

This invention relates to 1-alkyl-4-(N-benzyl-N-β-pyrrolidinoethylamino)-piperidines, their salts, and to a method for the preparation thereof.

The new 1-alkyl-4-(N-benzyl-N-β-pyrrolidinoethylamino)-piperidines may be represented by the formula:

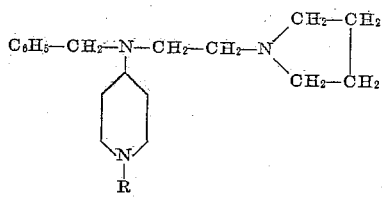

wherein R is a lower-alkyl group containing from one to eight carbon atoms, inclusive.

The products of this invention are useful as therapeutic agents.

The tertiary amines are high-boiling liquids which may be partially solid at room temperatures, readily soluble in most common organic liquids, and slightly soluble in water. The free bases readily form addition salts with mineral acids, such as hydrochloric, hydrobromic, and sulfuric acid; with organic carboxylic acids such as acetic, lactic, tartaric, and succinic; and strongly acidic phenols such as picric acid. These acid salts are usually very water soluble, some salts, e. g., hydrochlorides, having such a strong affinity for water that it is difficult to obtain them in an anhydrous form. These salts may however be readily prepared in aqueous solution.

The compounds of this invention, having three strongly basic tertiary amino groups, form stable salts with from one to three equivalents of an acid. The mono- and di-acid salts may be formed by reacting the stoichiometric quantity of the acid with the free basic amine followed by solvent removal, if a solvent is used. An excess of the acid gives only the tri-acid salt of the amine. When the salt is used for therapeutic purposes, since the therapeutic activity resides in the basic portion of the salt, the acid groups in the salt are of significance only in that they be non-toxic and in that they reduce the effectiveness of the molecule, on a weight basis, in proportion to their number.

The 1-alkyl-4-(N-benzyl-N-β-pyrrolidinoethylamino)-piperidines may be prepared by the alkylation of a 1-alkyl-4-(N-β-pyrrolidinoethylamino)-piperidine with a benzyl halide, preferably benzyl bromide or benzyl chloride.

The alkylation by this procedure requires an elevated temperature and an acid-binding agent. In some instances an alkylation catalyst may be helpful. The alkylation may be conducted without a diluent, although the use of a diluent such as toluene, xylene, or cymene is preferred. Various catalysts useful in alkylating amines, such as finely divided copper-bronze, may be used if desired. Anhydrous metal carbonates or bicarbonates are useful acid-binding agents, those of the alkali metals being preferred. An excess of the starting amine may also be used for acid-binding purposes. The alkylation may be carried out by mixing the reactants in substantially equimolar proportions with or without the diluent, followed by heating as to about 150–170 degrees centigrade. The length of the period of heating is not of critical importance, various times as from 5 to 50 hours being suitable.

The products may be isolated from the reaction mixture in manner known to the art. For example, after cooling, water is added to the mixture, catalyst removed by filtration, and the water-insoluble layer separated, dried, and distilled. The catalyst may be removed prior to the addition of water or after the layers are separated, the former process being the more desirable. As the products are somewhat water soluble, the aqueous layer is extracted with a water-immiscible solvent such as ether, chloroform, et cetera, which extract is combined with the original water-insoluble product obtained. The combined extracts, after drying, may be distilled. Other ways of isolation and purification of the products of this invention will be apparent to those familiar with the art.

Salts of the amines of this invention with acids may be prepared in various ways known to the art. If an aqueous solution of the salt is desired, the amine may be titrated with an acid until the resulting solution has attained the desired pH. If it is desired to isolate the amine salt, this may be done by evaporating its solution to dryness. Alternatively, a solution of the amine may be reacted with a solution of the acid, the solvent chosen being one in which the amine salt is insoluble. Many of the salts are hygroscopic. Some are isolated free of solvent only with difficulty.

The following examples are given to illustrate the invention but are not to be construed as limiting.

*Example 1.—Pyrrolidinoacetonitrile*

To 142 grams of pyrrolidine maintained at 25 degrees centigrade was added a solution of 208 grams of sodium bisulfite dissolved in 200 milliliters of water. After addition was complete, 162 grams of 37 percent aqueous formaldehyde was added to the stirred solution while the temperature was maintained at 25-30 degrees centigrade. The temperature of the reaction mixture was then raised to about 60 degrees centigrade and 130 grams of potassium cyanide dissolved in 200 milliliters of water added over a period of about 45 minutes. The resulting milky solution was then heated at 95 degrees centigrade for an additional six hours. Upon cooling, the liquid was decanted from the settled solids. An upper layer of pyrrolidinoacetonitrile was separated and the aqueous layer extracted several times with 200-milliliter portions of ether. The ether extracts were combined with the oil first separated, dried, and the residual oil fractionated to give pyrrolidinoacetonitrile, distilling at 86 degrees centigrade at a pressure of 22 millimeters of mercury; $n_D^{26}=1.4558$. Picrate: M. P. 153 to 154 degrees centigrade with decomposition.

*Example 2.—β-Pyrrolidinoethylamine*

One hundred and sixty-five grams of pyrrolidinoacetonitrile was reduced in suitable apparatus under an initial hydrogen pressure of 3690 pounds per square inch and at a temperature of 85 degrees centigrade in the absence of solvent, using 10 grams of Raney nickel as a catalyst. After five hours, about 81 percent of the calculated quantity of hydrogen had been absorbed, whereupon the mixture was taken from the bomb, separated from catalyst, and fractionated. There was obtained 63.5 grams of β-pyrrolidinoethylamine boiling at 159-163 degrees centigrade at 750 millimeters of mercury pressure. The picrate thereof melted with decomposition at 218-220 degrees centigrade.

*Example 3.—1-ethyl-4-(N-β-pyrrolidinoethylamino)-piperidine*

Thirty-four and two-tenths grams of β-pyrrolidinoethylamine and thirty-eight and one-tenth grams of 1-ethyl-4-piperidone [J. Am. Chem. Soc. 68, 1239 (1946)] were mixed at room temperature. One hundred milliliters of absolute alcohol was then added and the solution hydrogenated in a suitable apparatus under an initial hydrogen pressure of 50 pounds per square inch at room temperature using a platinum oxide catalyst. After the absorption of hydrogen had ceased, catalyst was removed and the resulting solution fractionated. There was thus obtained 34 grams of 1-ethyl-4-(N-β-pyrrolidinoethylamino)-piperidine, boiling at 101-104 degrees centigrade at a pressure of 0.05 millimeter of mercury. The dipicrate melted at 255 degrees centigrade with decomposition.

*Example 4.—1-ethyl-4-(N-benzyl-N-β-pyrrolidinoethylamino)-piperidine*

To a stirred suspension of 61.7 grams of 1-ethyl-4-(N-β-pyrrolidinoethylamino)-piperidine dissolved in 500 milliliters of xylene, 40.2 grams of anhydrous potassium carbonate, and 0.5 grams of copper-bronze powder, there was added over a period of thirty minutes 49.8 grams of benzyl bromide. The reaction mixture was then heated for 40 hours at a temperature of 150-170 degrees centigrade. Upon cooling, 25 milliliters of water was added, the copper-bronze catalyst removed by filtration, and a layer of crude 1-ethyl-4-(N-benzyl-N-β-pyrrolidinoethylamino)-piperidine separated from the water. The water was extracted with ether, the ether extract combined with the crude product previously separated, the ether solution dried, ether removed, and the residual oil fractionated. Nineteen grams of 1-ethyl-4-(N-benzyl-β-pyrrolidinoethylamino)-piperidine, distilling at 167-169 degrees centigrade under a pressure of 0.8 millimeter of mercury, was obtained. Its tripicrate melted at 198.6-200 degrees centigrade with decomposition.

*Example 5.—1-methyl-4-(N-benzyl-N-β-pyrrolidinoethylamino)-piperidine*

By substituting 1-methyl-4-(N-β-pyrrolidinoethylamino)-piperidine for the 1-ethyl-4-(N-β-pyrrolidinoethylamino)-piperidine used in Example 5, 1-methyl-4-(N-benzyl-N-β-pyrrolidinoethylamino)-piperidine, a high boiling viscous liquid, is produced. This may be converted to its salts, e. g., the trihydrochloride or tripicrate, by the procedure indicated previously.

Still other compounds within the scope of my invention are the 1-propyl-, 1-isopropyl-, 1-butyl-, 1-pentyl- and other 1-lower-alkyl-4-(N-benzyl-N-β-pyrrolidinoethylamino)-piperidines, and salts thereof, which may be prepared according to the given procedure by use of the selected 1-alkyl-4-(N-β-pyrrolidinoethylamino)-piperidine and a benzyl halide.

Various modifications may be made in the present invention without departing from the spirit or scope thereof and it is to be understood as limited only as defined in the appended claims.

I claim:

1. A compound selected from the group consisting of (a) 1-lower-alkyl-4-(N-benzyl-N-β-pyrrolidinoethylamino)-piperidines wherein the lower-alkyl radical contains from one to eight carbon atoms, inclusive, and (b) acid salts thereof.

2. 1-ethyl-4-(N-benzyl-N-β-pyrrolidinoethylamino)-piperidine.

3. 1-ethyl-4-(N-benzyl-N-β-pyrrolidinoethylamino)-piperidine tripicrate.

4. The process for the preparation of a 1-alkyl-4-(N-benzyl-N-β-pyrrolidinoethylamino)-piperidine which includes the step of heating a 1-alkyl-4-(N-β-pyrrolidinoethylamino)-piperidine with a benzyl halide selected from the group consisting of the bromide and chloride in the presence of an acid-binding agent to produce a 1-alkyl-4-(N-benzyl-N-β-pyrrolidinoethylamino)-piperidine.

ROBERT H. REITSEMA.

No references cited.